Patented Mar. 11, 1952

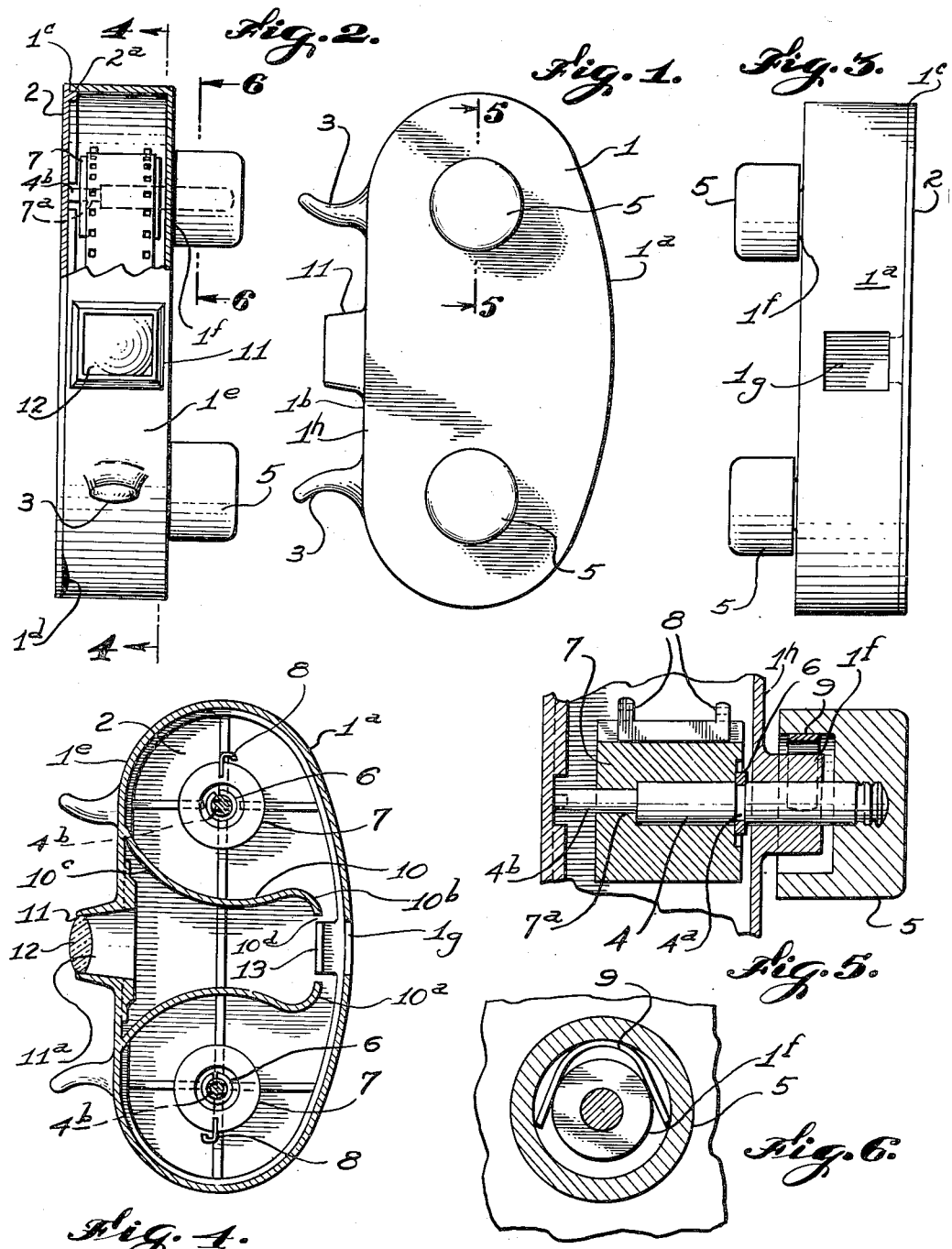

2,588,803

UNITED STATES PATENT OFFICE 2,588,803

FILM VIEWER

Francis T. Coffey, Sr., Los Angeles, Calif.

Application June 23, 1949, Serial No. 100,771

7 Claims. (Cl. 40—86)

My invention relates to a film viewer, particularly to a device for viewing what are referred to as still transparencies.

One of the principal objects of this invention is to provide a simple, easy-to-handle, and small device whereby a strip of individual film transparencies may be readily contained, protected, carried, and viewed as and when desired, and whereby the strip of film in the device may be moved through the device forwardly or in a reverse direction as often and when desired.

Another important object of this invention is to provide a device of this class whereby a relatively long strip of film, containing many transparencies or pictures, may be contained and moved and seen therethrough.

An important object also of this invention is to provide a device of this class in which the strip of film may be easily mounted and removed.

A further important object of this invention is to provide a simple case for a device of this class in which all of the parts are encased, or on which they are mounted, and in which substantially the only removable part is a cover which is easily pressed and frictionally held in position, and as easily removed from the case.

Still another important object of this invention is to provide simple, removable spools within the case upon which the opposite ends of the strip of film are secured and adapted to be rolled, an important object also being the provision of separate knobs for moving the film through the case in opposite directions in such a manner that the spools are frictionally held against free rotation so as to hold the desired picture of the film in the line of sight through the case.

An important object of this invention also is the provision of simple guide means within the case whereby the film is threaded through or directed between the spools and across or in front of the opening in the case through which the film may be seen.

A novel feature of this invention is the provision of simple means on the case for holding the same firmly by and between the fingers of one hand while the knobs are rotated for moving the film through the case.

With these and other objects in view, as will appear hereinafter, I have devised a film viewer having certain novel features of construction, combination, and arrangement of parts and portions, as will be hereinafter described in detail, and particularly set forth in the appended claims, reference being had to the accompanying drawings and to the characters of reference thereon, which form a part of this application, in which:

Fig. 1 is a side elevational view of my film viewer in a preferred form of construction:

Fig. 2 is a fragmentary front elevational view thereof with a portion of the front wall broken away to facilitate the illustration;

Fig. 3 is a rear elevational view thereof;

Fig. 4 is a sectional elevational view thereof, taken through 4—4 of Fig. 2;

Fig. 5 is an enlarged longitudinal sectional view thereof through the spool and the knob for rotating the same; and Fig. 6 is also an enlarged transverse sectional view through the knob with the section taken through 6—6 of Fig. 2.

The side of the case 1, as shown in Figs. 1 and 4, is substantially elliptical, the front side 1a being convex while the rear side 1b may be straight. The case is flat and is open at one side, as indicated by 1c. This opening is normally closed by means of a flat cover 2 against the outer side of the case, but it is provided with a surrounding guide flange 2a for aligning it with the open side of the case. This cover is frictionally held over the open side of the case so that it may be merely pressed into closed position or readily removed therefrom, such as by means of a fingernail depression 1d, as shown in Fig. 2.

The case is provided at the back side with a pair of substantially hook-shaped portions 3 which extend backwardly from the back wall 1e and are adapted for receiving two of the fingers of one hand for holding the case when viewing the film therein.

On the side wall 1h of the case is provided outwardly extending hubs 1f which are positioned near the opposite ends of the case and are positioned on axes which are parallel to each other. In the hubs are rotatably mounted spindles 4 which are provided at their outer ends with knobs 5. The knobs are cup-shaped and fit over the hubs. The spindles are held in position by means of snap rings 6 which are removably snapped into annular grooves 4a in the spindles immediately at the inner side of the wall 1h of the case.

The spools 7 are loosely mounted over the spindles 4, but they are provided at their outer end portions with contracted recesses 7a into which flattened ends 4b of the spindles extend, providing substantially keys for non-rotatably mounting the spools on the spindles.

At one side of the spools are embedded prongs 8. Two of these prongs are provided on each spool, and both are formed from one U-shaped member which is embedded in the spool at one side. The prongs are bent, as shown in Fig. 4.

On each hub is mounted a leaf spring 9, the free end of which engages the inside of the cup-shaped knob, to provide sufficient friction to prevent the spindles from rotating freely on the hubs.

A strip of film transparencies, not shown, is threaded over both spools, and the film is directed around a partition wall 10 located within the case and extending forwardly from the rear wall and forming a loop at its forward portion, as indicated by 10a, this loop being spaced backwardly from the front wall. This loop 10a merges in gradual curves, as indicated by 10b, with portions 10c extending substantially in circular form around the spools and thereby separating the film from the middle portion of the case. In the front wall 1a of the case is an opening 1g which is aligned with a cutaway portion 10ᵈ in the loop 10ᵃ, and also with an opening 11ᵃ in a backwardly extending enclosure 11 mounted on the back wall 1ᵉ of the case. In this opening is positioned a lens 12.

On the cover 2 is provided a film guide 13 which, when the cover is pressed into position, closes the outer side of the cutaway portion 10ᵈ in the loop 10ᵃ, and thereby guides the outer edge of the strip of film when it is moved through the case in front of the opening 1ᵍ.

I wish it to be understood that I do not desire to be limited to the exact details of construction shown and described, for obvious modifications will occur to a person skilled in the art.

I claim:

1. A film viewer, comprising a case having a flat side and a peripheral wall, a pair of spools rotatably mounted on and supported solely by said flat side, said spools being rotatable on parallel axes perpendicularly to the flat side of the case, one near the opposite ends thereof, means at the outer flat side of the case for rotating either spool, said case having aligned openings in the opposite portions of said peripheral wall of the case providing a line of sight and located between the two spools, the line of sight being perpendicular to the flat side of the film adapted to extend between the spools, a lens arranged in the line of sight of the case, and a cover normally closing the open side of the case.

2. A film viewer, comprising a case having a flat side and a peripheral wall, said case being open at one side, a cover removably positioned over the open side, and a pair of spools rotatably mounted on and supported solely by said flat side, said spools being rotatable on parallel axes perpendicularly to the flat side of the case, one near the opposite ends thereof, means exteriorly of and adjacent the outer flat side of the case for rotating either spool, said case having aligned openings in the opposite edges of the case providing a line of sight and located between the two spools, the line of sight being perpendicular to the flat side of the film adapted to extend between the spools, and a lens arranged in the line of sight of the case.

3. A film viewer, comprising a flat case and a pair of spools rotatably mounted on parallel axes perpendicularly to the flat side of the case, one near the opposite ends thereof, friction means rotatable with said spools and operative to retard free rotation of the spools, means at the outer flat side of the case for rotating either spool, said case having aligned openings in the opposite edges of the case providing a line of sight and located between the two spools, the line of sight being perpendicular to the flat side of the film adapted to extend between the spools, and a lens arranged in the line of sight of the case.

4. A film viewer, comprising a flat case, the case having hubs extending outwardly from one of the flat sides thereof, the axes of the hubs being arranged on axes perpendicular to said side, one near the opposite ends of the case, spindles rotatably mounted in the hubs, one end extending into the case and the other end extending outwardly beyond the hubs, spools non-rotatably mounted on the portions of the spindles within the case, and a knob on the outer end of each spindle for rotating the spool carried thereby, spring means between the knobs and the hubs for retarding free rotation of the knobs, said case having aligned openings in the opposite edges of the case providing a line of sight and located between the two spools, the line of sight being perpendicular to the flat side of the film adapted to extend between the spools, and a lens arranged in the line of sight of the case.

5. A film viewer, comprising a flat case open at one side, a cover removably positioned over the opening, the case having hubs extending outwardly from one of the flat sides thereof, the axes of the hubs being arranged on axes perpendicular to said side, one near the opposite ends of the case, spindles rotatably mounted in the hubs, one end extending into the case and the other end extending outwardly beyond the hubs, spools non-rotatably mounted on the portions of the spindles within the case, and a hollow knob on the outer end of each spindle for rotating the spool carried thereby, a V-shaped spring disposed within each knob with its leg portions engaging a said hub for retarding free rotation thereof, said case having aligned openings in the opposite edges of the case providing a line of sight and located between the two spools, the line of sight being perpendicular to the flat side of the film adapted to extend between the spools, and a lens arranged in the line of sight of the case.

6. A film viewer, comprising a case having openings in its opposite walls providing a line of sight through the case, means within the case for supporting a film, and finger-grip arms on the back wall of the case adjacent the upper and lower ends thereof, the arms being positioned at the opposite sides of said line of sight and provided with concave recesses at their outer sides for receiving the thumb and forefinger of a hand for holding the case.

7. A film viewer, comprising a case having a flat side and a peripheral wall defining an opening, a cover normally positioned against the case and closing said open side, the case having a pair of integral hubs projecting outwardly from said flat side, the axes of said hubs being perpendicular to said flat side, each hub being disposed adjacent an end of the case, a spindle rotatable in each hub and having one end extending into the case and another end projecting outwardly from the hub, a spool mounted on the portion of each spindle within the case, a hollow knob fast on the outer end of each spindle for rotating the same, a U-shaped spring compressed within each knob with its loop portion and the ends of its leg portions engaging the inner circular surface of said knob, intermediate portions of the legs of the spring frictionally engaging the periphery of a said hub so as to resist rotation of said knob relative to said hub.

FRANCIS T. COFFEY, Sr.

REFERENCES CITED

The following references are of record in the file of this patent:

UNITED STATES PATENTS

| Number | Name | Date |
|---|---|---|
| 327,951 | Jones | Oct. 6, 1885 |
| 1,450,555 | Lepine | Apr. 3, 1923 |
| 1,729,480 | Hale | Sept. 24, 1929 |
| 2,029,415 | Dennis | Feb. 4, 1936 |
| 2,394,711 | Miesegaes | Feb. 12, 1946 |

FOREIGN PATENTS

| Number | Country | Date |
|---|---|---|
| 565,432 | France | Nov. 7, 1923 |